United States Patent
Kaminsky et al.

(10) Patent No.: US 9,313,213 B2
(45) Date of Patent: Apr. 12, 2016

(54) SYSTEM AND METHOD FOR DETECTING CLASSES OF AUTOMATED BROWSER AGENTS

(71) Applicants: Daniel Kaminsky, San Francisco, CA (US); Michael J. J. Tiffany, New York, NY (US)

(72) Inventors: Daniel Kaminsky, San Francisco, CA (US); Michael J. J. Tiffany, New York, NY (US)

(73) Assignee: WHITE OPS, INC., Brooklyn, NY (US)

(*) Notice: Subject to any disclaimer, the term of this patent is extended or adjusted under 35 U.S.C. 154(b) by 243 days.

(21) Appl. No.: 14/057,730

(22) Filed: Oct. 18, 2013

(65) Prior Publication Data
US 2015/0112892 A1   Apr. 23, 2015

Related U.S. Application Data

(60) Provisional application No. 61/715,815, filed on Oct. 18, 2012.

(51) Int. Cl.
*H04L 29/06* (2006.01)
*G06N 7/00* (2006.01)

(52) U.S. Cl.
CPC . *H04L 63/12* (2013.01); *G06N 7/00* (2013.01)

(58) Field of Classification Search
CPC .................................. H04L 63/12; G06N 7/00
See application file for complete search history.

(56) References Cited

U.S. PATENT DOCUMENTS

| | | | |
|---|---|---|---|
| 7,752,308 B2 * | 7/2010 | Hutchinson | 709/224 |
| 2011/0214187 A1 * | 9/2011 | Wittenstein et al. | 726/25 |
| 2012/0079596 A1 * | 3/2012 | Thomas et al. | 726/24 |
| 2013/0227078 A1 * | 8/2013 | Wei et al. | 709/219 |
| 2013/0227691 A1 * | 8/2013 | Aziz et al. | 726/24 |
| 2013/0291107 A1 * | 10/2013 | Marck et al. | 726/23 |
| 2014/0222990 A1 * | 8/2014 | Hewitt et al. | 709/224 |
| 2014/0282872 A1 * | 9/2014 | Hansen et al. | 726/3 |
| 2014/0283038 A1 * | 9/2014 | Call et al. | 726/22 |
| 2014/0283069 A1 * | 9/2014 | Call et al. | 726/23 |

* cited by examiner

*Primary Examiner* — Alan Chen
(74) *Attorney, Agent, or Firm* — Nadya Reingand; Yan Hankin

(57) ABSTRACT

A method for determining if a web browser is being operated by a human or a non-human agent, based on analysis of certain aspects of how a user interacts with a webpage. By placing a code snippet into the code of a webpage prior to a given user accessing that webpage, one is able to evaluate the user's actions in order to predict the type of user. The predictions are made by acquiring information on how the user loads, navigates, and interacts with the webpage and comparing that information with statistics taken from a control group. Performance metrics from all webpages containing similar code elements are compiled by analysis servers and made available to the operator of a webpage through a variety of reporting mediums. By compiling such performance metrics, the method helps combat and prevent malicious automated traffic directed at advertisements and other aspects of a given webpage.

20 Claims, 3 Drawing Sheets

SYSTEM AND METHOD FOR DETECTING CLASSES OF AUTOMATED BROWSER AGENTS

CROSS-REFERENCE TO RELATED APPLICATIONS

This patent application claims priority to, and incorporates fully by reference, U.S. Provisional Patent Application No. 61/715,815, filed Oct. 18, 2012.

FIELD OF THE INVENTION

This invention relates to the general field of Internet communications software, and it has certain specific applications to the analytical evaluation of Internet communications.

BACKGROUND OF THE INVENTION

For a host of reasons, numerous individuals and organizations are actively engaged on a daily basis in sending malicious, automated traffic to web pages and other internet destinations, and making that traffic appear as if it that traffic is human and not automated. For example, the vast majority of revenue presently derived from Internet traffic results from paid advertising. Companies and individuals pay for the placement of advertisements on the Internet where they may be seen and interacted with by people who may be interested in learning about and purchasing their products. Given that these advertising interactions take place electronically and at a distance, it is possible for those interested in capturing some portion of the revenue spent on Internet advertising to employ automated software agents to defraud those paying for the advertising. This is done by making it appear as if advertisements have been viewed by humans who may be interested in a given product, where, in reality, a given advertisement has only been viewed or interacted with by malicious software, which exists only for the purpose of committing such acts of fraud.

Currently, there exist passive systems and methods which detect automation, or bot, differentials such as, for example, whether all content is loaded, or whether request rates match legitimate browsers. Detection of these differentials is helpful from a networking hardware perspective—one can implement the system on a network, interfere with nothing, and recover data. This data, however, is not necessarily high quality because, for example, legitimate human users might have unusual access patterns, caching layers prevents requests like automated bots might, and most importantly, bots are increasingly becoming full browsers thus matching many of these passive metrics quite frequently.

SUMMARY OF THE INVENTION

During the initial learning period, all browsing activity on a page (e.g. mouse clicks) can be split into groups based on their origin. For example, page requests coming from computers on protected government network are most likely submitted by humans, and will be categorized as such. Requests coming from IP addresses belonging to known bot networks have a low probability of being human interaction and will be categorized in a separate group.

Data collection by the analysis server is made possible by code snippets inserted (or injected) into the page code by the web server before the page is sent to the user's browser. This code performs data collection about the user's interaction with the web page and transmits the collected data to the analysis server via multiple communication channels.

At the bot detection stage, data transmitted to the analysis server is checked if it matches a pattern characteristic for human interaction or automated bot submission pattern. The typical elements of a bot pattern include, but are not limited to, (1) interaction with invisible elements of the page, (2) missing properties of an interaction (for example, a mouse click), (3) wrong interaction timing (for example, a mismatch between mouse down and mouse up timestamp), (4) interface behavior being atypical for human (for example, mouse moving along an absolutely straight line), (5) wrong page element property due to the fact that a bot failed to guess correctly what data will be entered by a browser during the page load, (6) a set of available communication channels does not match the set characteristic for the typical human-operated computer. The results of the detection are provided to the customer of the analysis system in real time or, alternatively, as a report for a given time period.

DETAILED DESCRIPTION OF THE PREFERRED EMBODIMENT

Definitions

Figure 1:
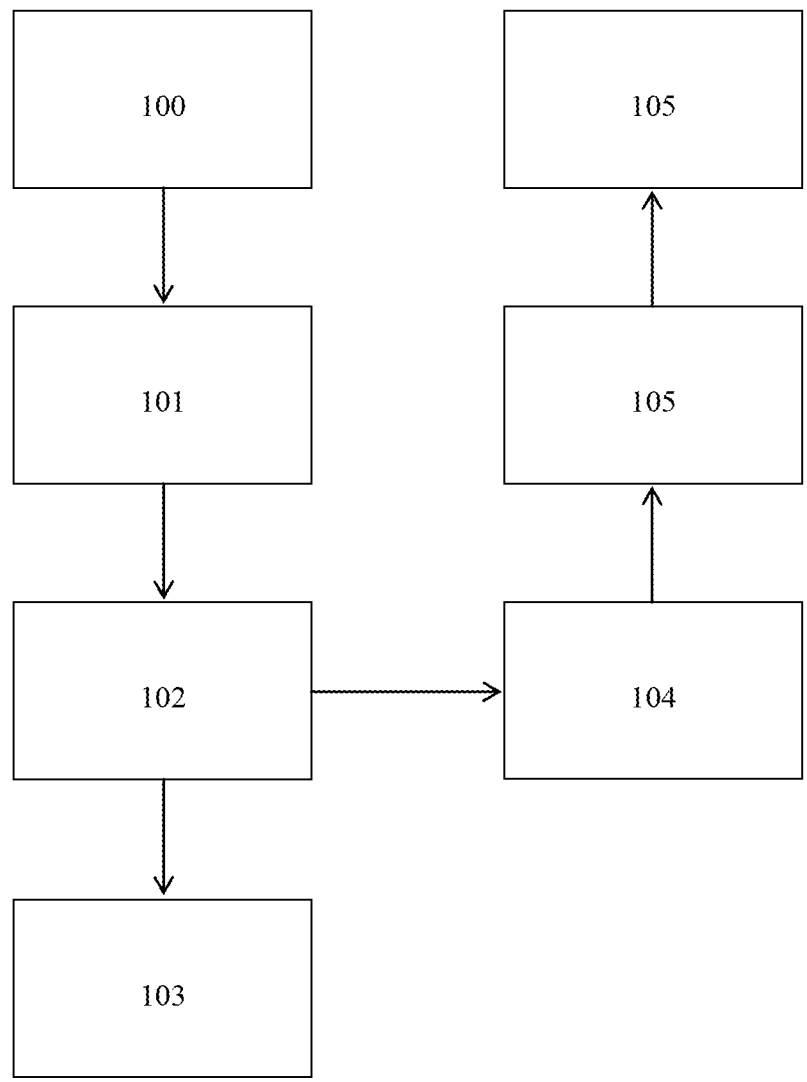
FIG. 1 illustrates an example of the deployment of the present invention in a typical webpage scenario.

HTML (HyperText Markup Language). The primary programming language used for creating, transmitting and displaying web pages and other information that can be displayed in an Internet browser.

HTTP (Hypertext Transfer Protocol). The standard World Wide Web client-server protocol used for the exchange of information (such as HTML documents, and client requests for such documents) between a Web browser and a Web server. HTTP includes several different types of messages which can be sent from the client to the server to request different types of server actions. For example, a "GET" message, which has the format GET <URL>, causes the server to return the content object located at the specified URL.

Means for detecting. This term includes, but is not limited to, inserting a code snippet into a page HTML code before the page is sent to a browser.

The present invention discloses an active probing model for the collection of qualitative metrics evaluating human-driven browsing activity against automated agent-driven (i.e. bot-driven) activity over a computer network. Through this active probing model, a much deeper reservoir of differentials between the two types of activity can be implemented (compared to the differentials used in the current state of the art). In contrast to passive methods of collecting content which already exists on a network and content sent to existing systems (i.e. current methods for bot detection), the method disclosed herein actively loads additional code and sends additional content on the wire to different and new locations ("active probing"). JavaScript (JS) and Flash, for example, can be actively probed by the claimed system and method in order to detect bot activity and assemble a report based on qualitative performance metrics.

The claimed system and method assumes that legitimate human users, by in large, have JavaScript and other active scripting technologies, including but not limited to Flash, enabled and are using full web browsers. As such, a non-browser bot will simply fail to execute any queries that are at all dependent on JavaScript. The trap set for potential attackers is that, in evading this exceedingly reliable detection mechanism, they must now actually emulate all parts of the browser. And because a real JavaScript environment—as well as other scripting technologies—has an infinite amount of properties that may be probed, the attacker must emulate every property potentially probed. Thus, previously unnoticed information and resulting discrepancies become exposed. For example, when a mouse event is falsified, one timestamp associated with that event may become absent; an auxiliary field may be set to a unique and incorrect value; or a mouse event rate is too stable or too unstable. Some examples of properties that can be probed include but are not limited to: (1) the precise relationship of mouse events seen on a page (e.g., a click associated with a mouse-up or mouse-down movement, agreement between the two timestamps associated with each mouse event, as discussed above, etc.); (2) the rate that Flash is updated (e.g., per second) and the reliability of its calls; (3) operation of Flash stages in all locations of operation (e.g., operating in sync); and (4) the speed of completing a graphical update (e.g. to a <CANVAS> element), which might indicate the type of hardware used or the active updating of a real user screen.

The present invention allows the differentiation of malicious automated agents from humans by gathering and processing elements of a given user's interaction with a web page that occurs after a web page has been loaded by the user, and comparing those elements to reference results drawn from a control group. This is achieved in part by placing certain elements within the code of a web page prior to it being loaded by a given user, so that those elements may be evaluated after that user has loaded that web page.

The elements monitored and evaluated fall into two main classes of data: (1) content that exists (or is absent, i.e. does not exist) at page load, and (2) content that is generated over time (or timing) as the page persists in potentially usable form. Content that exists at page load encompasses bits, or parts of code, which are accessible or visible even though they should not be. This content consists of JavaScript ("DOM") elements which exist (or do not exist) due to the manner in which the browser is hosted. For example, if loaded by a human user, some bits would be inaccessible for security or other reasons; however, if loaded by an automated agent or bot, the same bits would be accessible). For another example, automated agents also constantly and actively inject bot-specific configurations in manners that are different from the behavior of the browser or the site being monitored. In general, aspects of a shell (e.g. Internet Explorer, Firefox, Safari, Chrome) are exposed to the JavaScript environment in an engine (e.g. Trident, Gecko, Webkit), and bots, being shells themselves, either expose too much information or too little information, and the discrepancies are captured by the active probing model of the present invention. These captured characteristics include, but are not limited to, HTML5 standards compliance, patterns in error handling (including information about what language the errors are translated into), and browser elements injected by the browser shell rather than the native object (different objects are injected or not injected based on the host, which could be, e.g., Internet Explorer or an automated agent (i.e. bot) framework).

The second class of data, content that is generated over time (or timing), generally refers to elements that vary due to interaction with a human user. These might be events that take incorrect amounts of time, relative to one another, because there is no actual human for whom the events are being performed. Timing attacks work against more than just cryptographic systems. It is often faster, but sometimes much slower, to express the result of a browser operation (of which there are hundreds of thousands) when there is no screen to update and no user to inform. For example, error messages can be suppressed, or the graphics hardware might notice that no pixels require update. By measuring absolute and relative timing differentials, bots expose themselves to the claimed system and method. Tests are generated on the infinite number of such differentials, hosted quite infrequently (since the purpose of bots is to operate at scale, this does not have to occur often), and thus an attacking developer faces the obstacle of forging credentials he does not necessarily know in advance.

The present invention also collects data regarding any given user's interaction with a webpage after it has been loaded. This data includes, but is not limited to, mouse activity (where the mouse is located, number of updates per second, geometry of mouse movement, ancillary data to mouse event data—i.e. the metadata associated with a mouse click, scroll up, scroll down, or scroll over, the correlation between mouse events, etc.), missing data when an event is incorrectly synthesized, keyboard activity, accelerometer data, scroll events, average read and visit time, page update rate (animation rate has a strong correlation with visibility of a page), and supported network protocols and web standards (bots can break communication pathways).

The user interaction data elements are compared with reference results drawn from a set of three different control groups: (1) those interactions believed to be made by automated agents or bots, (2) those interactions believed to be made by a human, and (3) those interactions which are unclear as to whether performed by a human or a bot. The best control groups for sets of elements of true human interaction arise from web browsers driven from authenticated locations in places with no reason for advertising fraud. The best control groups for sets of elements of bot behavior arise from "bot zoos" or other automated agent networks.

Before the process of differentiation begins, an individualized code snippet must be inserted into the HTML code of a given web page. When this code snippet is present in the code of a given web page and that page is accessed, performance metrics are sent to remote analysis servers via asynchronous HTTP posts. These metrics evaluate the behavior and performance of the entity that viewed or is viewing the given web page, and how that page was loaded. The code snippet is injected as JavaScript alongside an advertisement or other script load event. As the Internet is comprised of many such loads (or injections), this invention creates merely one more. For example, a performance metric based on a mouse event can be collected in the following manner: (1) Handlers and listeners are registered for a mouse event; (2) The handler receives the various timestamps and values associated with the mouse event; (3) The system then emits the raw timestamps and values, or a summary thereof, over the network. If no listener is registered, it would be impossible to recover this data from the ambient traffic.

Performance metrics for various visitors to a given web page containing the code snippet, as well as those for all web pages containing similar code snippets are compiled and aggregated by the remote analysis servers into reportable metrics, which in turn are made available to the operator of a given web page in a number of reporting mediums, including, but not limited to, password protected interactive HTML dashboards, exportable spreadsheet documents, and subscription based email and PDF reports, and may be used in real time to control access to a given web page.

The performance metrics that are reportable include, but are not limited to, the origin and destination of a visitor, the likelihood that the visitor was an automated agent or human, and a variety of variables that identify information, such as advertising data points, including, but not limited to, advertising campaign specific code, the advertising medium, the source ID and the advertising provider.

These metrics are evaluated in such a way by the remote analysis servers that the information presented to the operator of a given web page that has included a code snippet is presented with a qualitative evaluation of whether or not a given visit to that web page was or was not made by an automated agent. This process of evaluation entails the following: the code snippet sends "emit events" from various "plugins". These emissions (i.e. "emit events") are sent via a variety of network channels, not all of which are always available. The present channels used are <img> tags, XMLHTTPRequests with CORS (Cross Origin Resource Sharing), and IFrame Form Post events. Initially, IFrame Form Posts are used, since they are the most compatible. Secondly, if CORS is compatible, the system can be upgraded to CORS. Other channels include WebSockets and Same Domain XMLHTTPRequest (which requires use of a local iframe that is configured to speak cross domain, through a toolkit like EasyXDM).

Furthermore, the computational process required to determine the above performance metrics and ultimately evaluate whether a visitor is automated or human can be implemented either via batch processing or via stream processing. Batch processing can be more efficient and can collate metrics across several events. Stream processing can scale better than batch processing but it cannot, for example, use future data to inform past impressions of normality (because, at the time of decision, the future event has not yet occurred). With stream processing, near-real time evaluation of a given user can be achieved. Thus, although normality metrics are determined by the past only, stream processing allows for the use of transaction identifiers embedded in a particular measurement event to evaluate, within thirty seconds of the last time of a given user's interaction, whether or not that user was a bot or a human.

FIG. 1 gives one example of how the present invention may be deployed in a typical webpage scenario. First, a code snippet containing a unique identified is inserted into the webpage 100. A user (human or automated) then requests the web page containing the code snippet 101. The web page containing the code snippet is loaded by the user 102. And as the user continues browsing normally 103, data regarding the user's interaction with the web page is sent to the analysis server 104, where the analysis server further analyzes the user data qualitatively 105.

Figure 2:
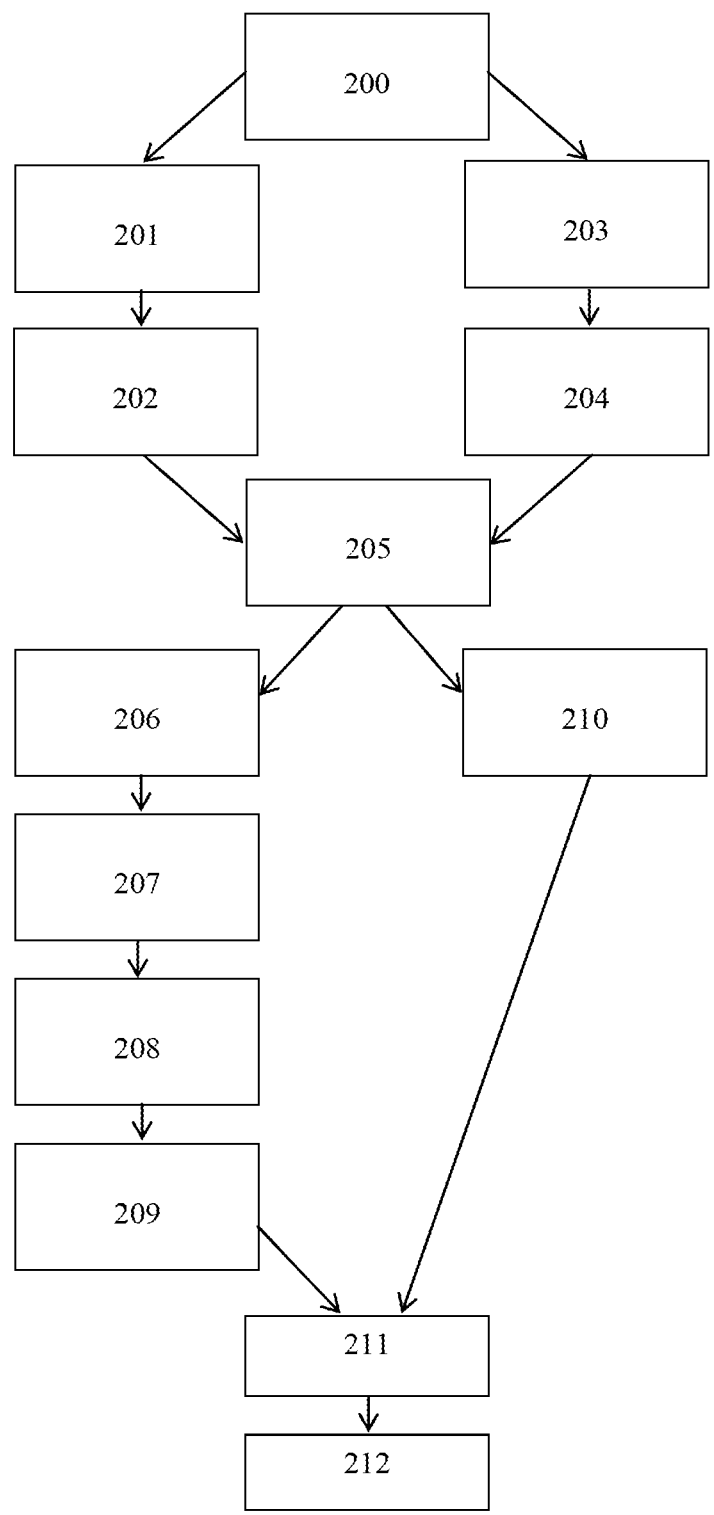
FIG. 2 illustrates an example of the process employed by the present invention to analyze internet traffic and determine whether a given user is a human or an automated agent.

FIG. 2 shows an example application of the repeatable process employed by the present invention to analyze internet traffic. The illustrated process is comprised of the following steps: Declare or collect customer (i.e. client) identifier, peer (i.e. who the customer would like to test against, e.g., publisher, advertisement location, secondary exchange, etc.) identifier, and transaction (i.e. the particular advertisement view) identifier 200; Load Loader GS 201 from analysis server; Script load of Signal Flare GIF 202 from analysis server; load Signal Flare GIF 203 from analysis server; load human monitor (pagespeed.js) 204 from analysis server; Report load succeeded, under state "init" with all available metrics to analysis server 205; If a human act is detected 206, immediately issue a second report (state "first") 207, wait six (6) seconds 208, and issue a final report (state "statecheck") 209; If no human act is detected 210, steps 207, 208, and 209 do not occur; Perform a qualitative analysis of available metrics and reports, if any 211; and Report a qualitative score for the Customer ID (session) 212.

Figure 3:
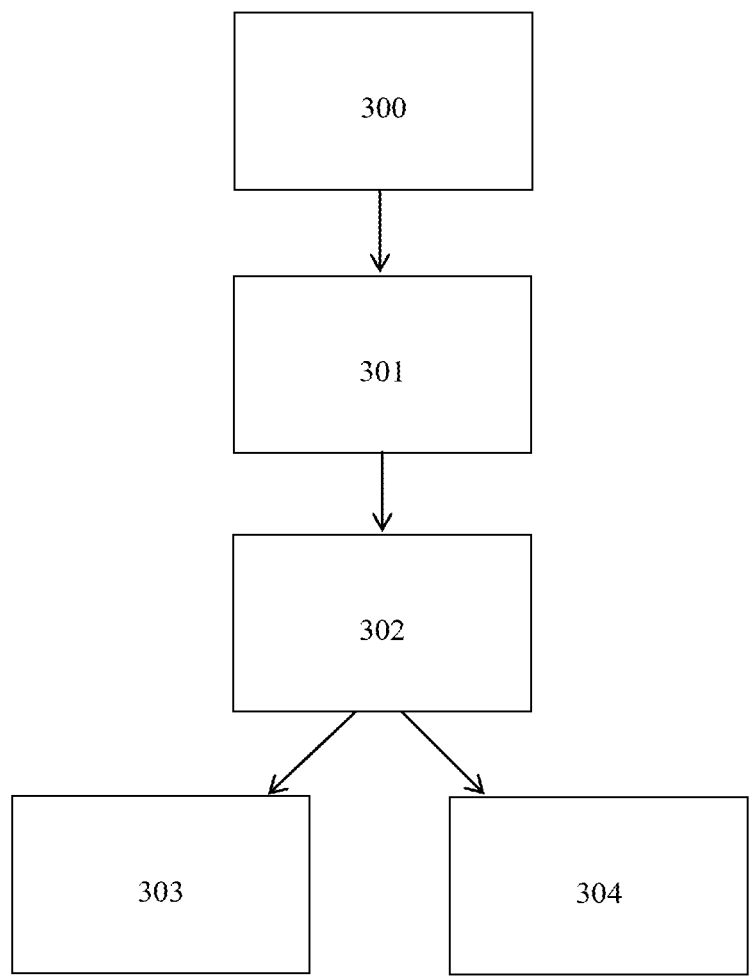
FIG. 3 illustrates the general data collection process of the present invention.

The process described above and illustrated by FIG. 2 is one example of the more general process employed and claimed by the present invention. Specifically, this broader process, shown in FIG. 3, occurs as follows: First, customer, peer, and transaction identifiers are collected 300; Next, these identifiers are embedded in an active probe, where the active probe (1) retrieves extra state from the client execution environment and (2) streams data back over multiple channels 301; Third, these actively probed characteristics are measured against known botprints (i.e. bot characteristics) 302. The two main classes of characteristics probed and analyzed are (1) what channels or information is available and/or absent (note: the presence, or absence, of a channel is, by itself, a botprint source), and (2) the time it takes for properties/characteristics to be probed. The performed analysis measures the degree/amount of automation as well as the degree/amount of true human interaction. Finally, reports are issued (1) to the customer/client, reporting on the automation/bot percentage 303, according to the dimensions given in the peer identifier, and (2) to the server for further analysis and extra characteristics for more botprint generation 304.

There are many applications for the presently claimed invention. In one application, the present technology integrates with financial anti-fraud (in a "send money" or a "shopping cart checkout" context). Another application of the present invention is for a pre-CAPTCHA signup auditor. It should be noted that the claimed system does not directly block a signup; it instead flags accounts that CAPTCHA systems are not noticing or catching. The claimed invention operates as an independent metric. It also operates as an excellent system for finding malware on internal enterprise networks, as most intranets use internal sites that attackers remotely browse. The system can detect that attackers are not actually the users they claim to be, even if and especially if they are tunneled through a machine on the corporate network.

The description of a preferred embodiment of the invention has been presented for purposes of illustration and description. It is not intended to be exhaustive or to limit the invention to the precise forms disclosed. Obviously, many modifications and variations will be apparent to practitioners skilled in this art. It is intended that the scope of the invention be defined by the following claims and their equivalents.

What is claimed is:

1. A method for detecting automated browser agents, comprising:

inserting a means for detecting information into a page code before a page is sent to a user's browser, sending said page to a user's browser, wherein said means sends emissions from one or more plugins via one or more channels, said emissions capturing client execution environment data without requiring a browser interaction and causing immediate and continued data collection of said client execution environment data, and transmitting via asynchronous HTTP posts said client execution environment data to an analysis server, wherein said analysis server compares said client execution environment data with a first database storing pattern characteristics for humans, a second database storing pattern characteristics for automated browser agents, and a third database storing pattern characteristics which are unclear as to whether performed by a human or a bot, thus forming a report on automated browser agent activity based on a qualitative evaluation of performance metrics collected, and making a conclusion on a probability of the user being an automated browser agent (a bot), said probability being based on which of said three databases has the highest match to said data.

2. The method of claim 1, wherein said means for detecting comprise a code snippet and said client execution environment data comprises HTML5 standards compliance.

3. The method of claim 2, further comprising: registering a handler and a listener for a given browser event, wherein said handler receives client execution environment data associated with said browser event and said listener enables recovery of otherwise unidentifiable data.

4. The method of claim 2, wherein said report is made available via a password protected interactive HTML dashboard, an exportable spreadsheet document, or a subscription based email or PDF report.

5. The method of claim 2, wherein said report is generated within one minute of a given user action.

6. The method of claim 2, wherein said data collection, comparing, and report is implemented via batch processing.

7. The method of claim 2, wherein said data collection, comparing, and report is implemented via stream processing.

8. The method of claim 2, further comprising integration with financial anti-fraud technology.

9. The method of claim 2, further comprising integration with a pre-CAPTCHA signup auditor.

10. The method of claim 2, wherein said client execution environment data further comprises mismatching communication channels.

11. The method of claim 2, wherein said client execution environment data further comprises a Flash update rate.

12. The method of claim 2, wherein said client execution environment data further comprises a syncing of Flash stages.

13. The method of claim 2, wherein said client execution environment data further comprises bot-specific injected configurations.

14. The method of claim 2, wherein said client execution environment data further comprises scroll events.

15. The method of claim 2, wherein said client execution environment data further comprises average read and visit time.

16. The method of claim 2, wherein said client execution environment data further comprises error handling information.

17. The method of claim 1, wherein said client execution environment data comprises information, generated over time, regarding the amount of time a given browser operation takes to update a graphic on a web age.

18. A non-transitory computer readable medium storing a program causing a computer to execute a process, comprising:
  a first stage of identification, comprising grouping browsing activity based on origin,
  a second stage of data collection, comprising sending a page containing a pre-inserted code snippet for recording of particular client execution environment data, at page load and after page load, and transmitting said client execution environment data to an analysis server,
  a third stage of evaluation within said analysis server, comprising comparing said client execution environment data against control groups comprising a first database storing pattern characteristics for humans, a second database storing pattern characteristics for automated browser agents, and a third database storing pattern characteristics which are unclear as to whether performed by a human or a bot,
  and a fourth stage of reporting, comprising compiling a predictive report on bot activity based on a qualitative evaluation of performance metrics collected, said predictive report disclosing the highest matching database of said three databases.

19. The medium of claim 18, wherein said client execution environment data comprises an interaction with invisible elements of a page, missing properties of an interaction, atypical interface behavior, a wrong page element property, mismatching communication channels, a Flash update rate, syncing of Flash stages, a graphical update rate, error handling information, HTML5 standards compliance, bot-specific injected configurations, keyboard activity, accelerometer data, scroll events, and average read and visit time.

20. The medium of claim 18, wherein said client execution environment data comprises the amount of time a given browser operation takes to update a graphic on a given web page.

* * * * *